United States Patent
Vanderbeken et al.

(10) Patent No.: US 8,956,272 B2
(45) Date of Patent: Feb. 17, 2015

(54) METHOD AND APPARATUS FOR REMOVAL OF TARS OR RESINS FROM A SCRUBBER LIQUID USING A CENTRIFUGE WITH A DISCHARGE CHAMBER SCRAPER

(75) Inventors: Cedric Jean-Luc Vanderbeken, Vancouver (CA); Olivier Hugo Christopher Dany Vanderbeken, Sudbury (CA)

(73) Assignee: Vanderbeken Ent. Ltd, Sudbury, Ontario (CA)

( * ) Notice: Subject to any disclaimer, the term of this patent is extended or adjusted under 35 U.S.C. 154(b) by 366 days.

(21) Appl. No.: 13/341,602

(22) Filed: Dec. 30, 2011

(65) Prior Publication Data
US 2013/0172167 A1 Jul. 4, 2013

(51) Int. Cl.
B04B 1/20 (2006.01)
B04B 11/08 (2006.01)

(52) U.S. Cl.
USPC .................................. 494/37; 494/53; 494/56

(58) Field of Classification Search
CPC ............ B04B 1/20; B04B 7/04; B04B 11/08; B04B 15/06; B04B 2001/2091; B04B 2011/086; B04B 2011/088
USPC .............................. 494/53–56, 37; 210/380.3
See application file for complete search history.

(56) References Cited

U.S. PATENT DOCUMENTS

| | | | | |
|---|---|---|---|---|
| 2,090,142 A | * | 8/1937 | Nonhebel et al. | 423/243.08 |
| 2,366,899 A | | 9/1945 | Hall | |
| 3,105,045 A | * | 9/1963 | Borig | 494/60 |
| 3,399,828 A | * | 9/1968 | Fassle | 494/11 |
| 4,206,186 A | | 6/1980 | Holter | |
| 4,282,096 A | | 8/1981 | Burkert | |
| 4,364,796 A | | 12/1982 | Ishii | |
| 4,397,637 A | * | 8/1983 | Place | 494/1 |
| 4,617,010 A | * | 10/1986 | Epper et al. | 494/52 |
| 5,151,079 A | * | 9/1992 | Flanigan et al. | 494/27 |
| 5,156,751 A | * | 10/1992 | Miller | 210/787 |
| 5,277,809 A | * | 1/1994 | Eder | 210/380.1 |
| 5,338,285 A | * | 8/1994 | Omori | 494/55 |

(Continued)

FOREIGN PATENT DOCUMENTS

CN 201006493 Y * 1/2008
CN 101116843 A * 2/2008

(Continued)

OTHER PUBLICATIONS

Machine translation of CN 101116843 A.*
Machine translation of CN 201006493 Y.*
Jieheng Guo :Pyrolysis of Wood Powder and Gasication of Wood-derived Char / Eindhoven: Technische Universiteit Eindhoven, 2004.—Proefschrift.—ISBN 90-386-1935-9 NUR 961 p. 3-5, p. 43, p. 49.

(Continued)

Primary Examiner — Charles Cooley

(57) ABSTRACT

The invention is a method of processing tarry or resinous liquids. Tarry liquids include wet scrubber liquids containing tars and chars derived from gasification, pyrolysis or drying of biomass. Resinous liquids include those derived from processing coniferous biomass. Tarry or resinous liquid is processed by a horizontal axis centrifuge having a discharge chamber containing a scraper to prevent centrifuge clogging or fouling. The removed tar and char can be used as solid fuel or recycled to the gasification or pyrolysis process. Polymers, for instance cationic polymers, can be added to the tarry or resin containing liquid prior to centrifugation to assist in solids/liquids separation. Removed resin can be recycled for further use. Tar, char or resin depleted wet scrubber liquid can be recycled for further use or more easily treated prior to disposal.

17 Claims, 2 Drawing Sheets

(56) References Cited

U.S. PATENT DOCUMENTS

| | | | |
|---|---|---|---|
| 5,552,173 A * | 9/1996 | Singh et al. | 426/417 |
| 5,762,662 A * | 6/1998 | Wieser-Linhart | 96/53 |
| 5,800,332 A * | 9/1998 | Hensley | 494/53 |
| 5,897,689 A * | 4/1999 | Wieser-Linhart | 95/152 |
| 7,540,838 B2 * | 6/2009 | Scott et al. | 494/7 |
| 7,626,069 B2 | 12/2009 | Nissen | |
| 7,915,458 B2 | 3/2011 | Bruckmayer | |
| 8,042,281 B1 * | 10/2011 | Estes et al. | 34/312 |
| 2004/0220285 A1 | 11/2004 | Boerrigter | |
| 2007/0007170 A1 | 1/2007 | Strack | |
| 2008/0248940 A1 * | 10/2008 | Figgener et al. | 494/59 |
| 2012/0245014 A1 * | 9/2012 | Jones et al. | 494/37 |
| 2013/0168317 A1 * | 7/2013 | Vanderbeken | 210/663 |
| 2013/0172167 A1 * | 7/2013 | Vanderbeken et al. | 494/37 |

FOREIGN PATENT DOCUMENTS

| | | |
|---|---|---|
| CN | 101607780 | 12/2009 |
| JP | 2207098353 | 4/2007 |

OTHER PUBLICATIONS

Chunshan Li, Kenzi Suzuki,Tar property, analysis, reforming mechanism and model for biomass gasification—An overview Renewable and Sustainable Energy Reviews 13 (2009) 594-604.

Ziad Abu El-Rub, Biomass Char as an In-Situ Catalyst for Tar Removal in Gasification Systems, PhD thesis, Twente University, Enschede, The Netherlands, Mar. 2008, ISBN: 978-90-365-2637-1 Copyright© 2008 by Ziad Abu El-Rub, Enschede, The Netherlands Printed by Gildeprint Drukkerijen, Enschede, The Netherlands, 2008.

Abu El-Ruba, Z., Bramer, E.A., and Brem, G., "Experimental comparison of biomass chars with other catalysts for tar reduction", Fuel, vol. 87, issues 10-11, 2008, pp. 2243-2252.

J. Srinivasalu and S. K. Bhatia, \A modifieed discrete random pore model allowing for different initial surface reactivity, Carbon, vol. 38, pp. 47{58,2000.

\* cited by examiner

METHOD AND APPARATUS FOR REMOVAL OF TARS OR RESINS FROM A SCRUBBER LIQUID USING A CENTRIFUGE WITH A DISCHARGE CHAMBER SCRAPER

FIELD OF THE INVENTION

The present invention relates to a method and a device for separating carbon, hydrogen and oxygen containing tars and/or char from syngas wet scrubber liquids such as those derived from gasification or pyrolysis of biomass containing feedstocks including municipal solid waste or agricultural wastes including wood wastes.

The invention also relates to a method and device for removing resins from biomass derived resin containing liquids such as those derived from a coniferous source, for example, including spruce or pine. The solid discharges from the device can be used as such or pelletized for a variety of applications and markets.

DESCRIPTION OF THE PRIOR ART

It is known that waste to energy plants, for example biomass waste to energy plants, very often use the wet scrubber technique for cleaning the syngas of tar and/or char so that the syngas is more suitable for use as a fuel. The gas leaving the gas-making apparatus, e.g. gasifier or pyrolyzer, is usually brought into contact with liquid or a process derived liquid such as in a wet scrubber, for example an aqueous liquid i.e. containing water. Since a water containing scrubber solution is hydrophilic and the tar and/or char or resin are hydrophobic and semi-hydrophobic i.e. semi-hydrophilic, the scrubber liquid converts to a tarry suspension in water.

The resinous or tarry suspension of resin or tar and/or tar containing hydrophilic liquid such as water is extremely difficult to handle by prior art techniques including concentration, filtration, absorption, thickening, use of cyclones or dehydration. The product remains extremely hazardous if spilled into the environment. The resinous or tarry suspension may contain as much as 99.5% liquid or even higher. Alternatively, the resinous or tarry suspension may be in the form of a pasty, sticky, high viscosity resinous or tar/char greasy solid of up to 35% solids.

Untreated spent tar/char/liquid tarry suspensions derived from syngas wet scrubbers cannot be disposed of to the environment due to the content of tar, including mono-aromatic and poly-aromatic hydrocarbons and phenols. These components are toxic in bio-treatment systems and are possibly poisonous or carcinogenic.

According to a study published by the National Renewable Energy Laboratory, currently available technologies for tar removal do not meet the needs of the industry in terms of cost, performance, and environmental considerations (T. A. Milne, et al., "Biomass Gasification Tars, Their Nature, Formation, and Conversion", NRELITP 570-25357, November 1998). Devi et al further illustrate problems associated with handling tars derived from biomass processing ("A Review of the Primary Measures for Tar Elimination in Biomass Gasification Systems", Biomass and Bioenergy, 2003. 24(2):125-140).

Accordingly, a need exists for a method of and a device for treating this waste stream in an effective and simple way.

SUMMARY OF THE INVENTION

The current invention is a method and apparatus for cleaning resin or tar/char or tar-bearing scrubber liquids including scrubber liquids containing tarry or resinous suspensions containing water and tars containing hydrocarbons for example mono-aromatic or poly-aromatic hydrocarbons and phenols, naphthalenes or resins.

The tarry suspension is processed in a continuous feed horizontal axis centrifuge, to create tar/char or resin depleted liquid for recycle as syngas scrubber liquid or for treatment prior to discharge.

The continuous feed centrifuge also produces a liquid depleted centrifuge cake (tarry or resinous solids) for use as fuel, recycle to the gasifier or pyrolysis process to generate additional syngas or in the case of resinous solids for further use e.g. varnish or lacquer raw material.

The continuous feed centrifuge contains a moveable scraper driven by separate motor mounted on the discharge chamber and rotating at low speed in its discharge section to prevent clogging or fouling by the cake tar/solids unlike a centrifuge such as the scraper-free horizontal-axis type described in U.S. Pat. No. 7,915,458 to Bruckmeyer or the decanter centrifuge described in U.S. Pat. No. 5,897,689 to Wieser-Linhart. The scraper assembly consists of 1(one) or more scraper blades. The scraper blades rotate at low-rpm, on the same axis as the centrifuge bowl and scroll, to plow the discharge chamber. There is minimal clearance between the scraper blades and the discharge chamber walls. Solids plowed by the scraper generally discharge by gravity into a chute or conveyor.

Figure 1:
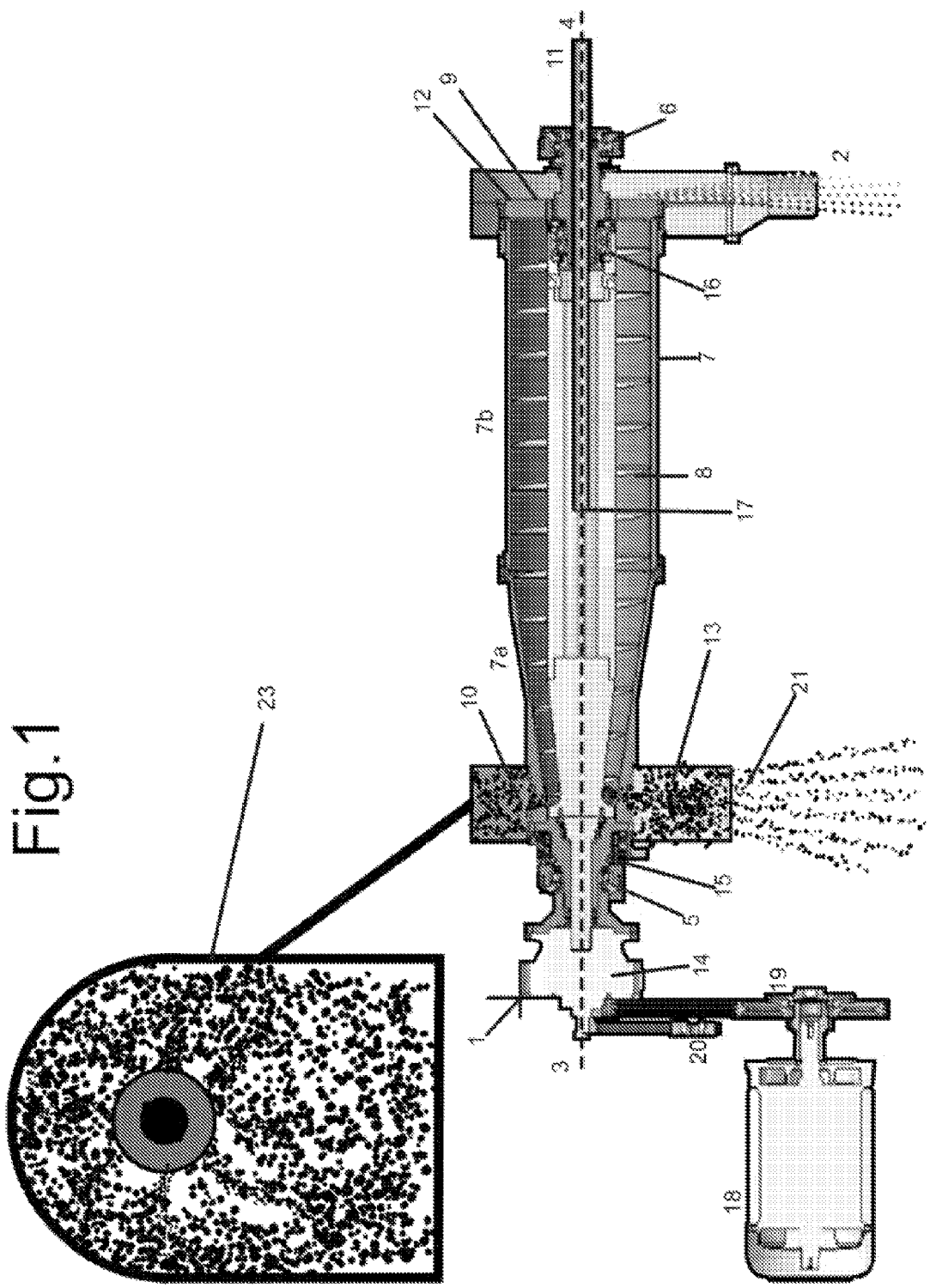
FIG. 1 is a sectional view through the length of a standard decanting centrifuge.

The following non-limiting example illustrates one use of the current invention:

FIG. 1 illustrates a horizontal axis centrifuge 1 which can be used for separating feed tarry or resinous suspension 4 via inlet 11 into cleaned liquid 2 and tarry solids 13.

The centrifuge 1 includes a horizontal rotation axis 3 and two bearings 5 and 6 on which a bowl 7 is rotating.

Within bowl 7 there is a rotatable screw 8 that is supported rotationally with respect to the axis 3 by two bearings 15 and 16.

The horizontal axis centrifuge 1 provides a centrifugal G-force of 1500 to 3200 on resinous or tarry suspension 4 introduced via inlet 11.

Screw 8 turns inside bowl 7 with a different speed than the bowl.

Bowl 7 is driven by a motor 18 via pulley 19.

Screw 8 is driven by a pulley 20 and via gearbox 14 allowing for a different speed between bowl 7 and screw 8.

A hydraulic or electric motor, with differential speed control, can be used as a substitute for pulley 20.

Bowl 7 is provided with a liquid phase outlet 9 and a tarry or resinous solids phase outlet 10.

Outlet 9 of cleaned liquid 2 may be provided with an adjustable weir disk or plate 12 at the rear wall of bowl 7, and the tarry or resinous solids outlet 10 is provided at the opposite wall of bowl 7 with a conical section 7a.

Screw 8 serves as a transportation means for material along the cylindrical, non-conical 7b section of bowl 7, radially and inwardly along the conical bowl section 7a towards the outlet 10.

Tarry or resinous suspension 4, with or without polymer (e.g. cationic polymer) added to agglomerate solids, introduced through inlet 11 at the centre of the centrifuge axis, is introduced the centrifuge bowl 7 at feed point 17.

The cleaned liquid 2 is discharged via the outlet 9 across the adjustable weir disk 12, or straight out when no weir disk or weir plate is used.

The tarry or resinous solids 13 are discharged via screw 8 along conical bowl section 7a through outlet 10 contained in discharge chamber 21.

Figure 2:
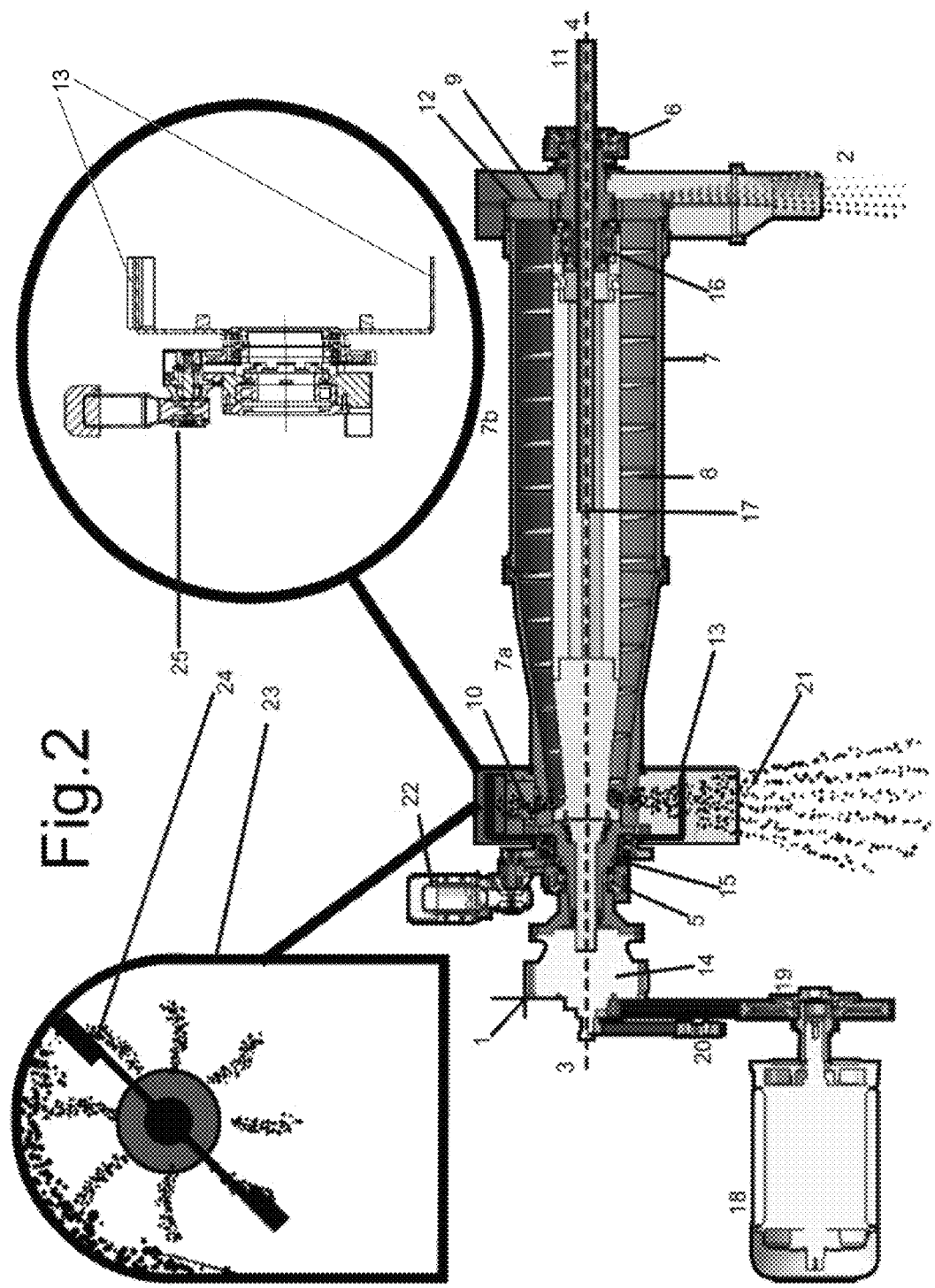
FIG. 2 is a sectional view through the length of the decanting centrifuge of the present disclosure showing details of construction thereof, including the discharge chamber, scraper and scraper mechanism.

FIG. 2 illustrates a scraper used in combination with the components of the apparatus illustrated in FIG. 1.

Scraper 24 of scraper assembly 25 consisting of a motor a gear and the scraper itself serves to prevent deposition of tarry or resinous solids inside discharge chamber assembly 21 and discharge chamber sub-assembly 23 via separate turning movement from bowl 7 or screw 8 via motor 22.

FIGS. 1 and 2 illustrate the relative buildup of tarry or resinous solids inside the discharge chamber subassembly 23 with and without scraper 24 respectively.

Lack of scraper 24 together with scraper assembly 25 results in uncontrollable, and undesirable repetitive fouling of discharge chamber assembly 21 and its subassembly 23.

The following 3 non-limiting examples describe the current invention:

EXAMPLE 1

Processing of Tarry Wet Scrubber Liquid Suspension Derived from Municipal Solid Waste Biomass Gasification Tarry suspension containing 0.5% solids by weight was input to the apparatus described in FIGS. 1 and 2 above with the following resulting output streams:
cleaned liquid having a solids content of ≤15 milligrams/liter suitable for recycling, treatment or discharge
powdery solids having a heating value of ~25 megajoules/kilogram and suitable for use as fuel or for recycling into the gasifier

EXAMPLE 2

Processing of Tarry Wet Scrubber Liquid Suspension Derived from Wood-chip Gasification Tarry suspension containing 20% solids by weight was input to the apparatus described in FIGS. 1 and 2 above with the following resulting output streams:
cleaned liquid having a solids content of ≤10 milligrams/liter suitable for recycling, treatment or discharge
tarry solids, containing 70% solids, having a heating value of ~25 megajoules/kilogram and suitable for use as fuel or for recycling into the gasifier

EXAMPLE 3

Processing of Resinous Liquid Suspension Derived from Drying of Coniferous Biomass Solids In the drying process of coniferous biomass, e.g. spruce or pine, aromatics and resins go in the vapor phase, and are partially condensed by reducing the temperature. However much resin, especially resin molecules that condense at lower temperatures remain in the vapor stream.

This vapor can be scrubbed with water to remove its contained resin and the resulting resinous water scrubber liquid can be fed into the horizontal axis centrifuge described in this invention to separate the contained resin in whole or part from the scrubber liquid. The scrubber liquid can then be recycled in whole or part or further treated in whole or part.

We claim:

1. A method of cleaning liquid suspensions comprising:
providing a decanter centrifuge having a bowl rotatable about an axis, a rotatable screw disposed within the bowl, a discharge chamber located at one end of the bowl for receiving solids separated in the bowl, a rotatable scraper disposed within the discharge chamber, a first drive mechanism for rotating the bowl and screw, a second drive mechanism independent from the first drive mechanism for rotating the scraper;
the method including feeding a tarry or resinous liquid suspension into the rotatable bowl, separating tarry or resinous solids from the liquid contained in the suspension and discharging the solids from the bowl into the discharge chamber, and preventing fouling of the discharge chamber by rotating the scraper independently of the bowl and screw at a speed sufficient to scrape the solids from the discharge chamber.

2. The method of claim 1 wherein the bowl rotates about a horizontal axis.

3. The method of claim 1 wherein the liquid suspension is a wet scrubber liquid containing tar and/or tar/char solids.

4. The method of claim 1 wherein the liquid suspension is a resin containing liquid derived from coniferous biomass solids.

5. The method of claim 1 wherein the liquid suspension contains water.

6. The method of claim 1 wherein the liquid suspension is a spent water scrubber derived from gasification or pyrolysis of biomass.

7. The method of claim 1 wherein the centrifuge is operated to generate a g-force of 1500 or more.

8. The method of claim 1 wherein the centrifuge is operated to generate a g-force of 3200 or less.

9. A decanter centrifuge comprising:
a bowl rotatable about an axis, a rotatable screw disposed within the bowl, a discharge chamber located at one end of the bowl for receiving solids separated in the bowl, a rotatable scraper disposed within the discharge chamber, a first drive mechanism for rotating the bowl and screw, a second drive mechanism independent from the first drive mechanism for rotating the scraper independently of the bowl and screw at a speed sufficient to prevent fouling of the discharge chamber by scraping the separated solids from the discharge chamber.

10. The centrifuge of claim 9 wherein the bowl rotates about a horizontal axis.

11. The centrifuge of claim 10 wherein the scraper rotates about said horizontal axis.

12. The centrifuge of claim 9 wherein the first drive mechanism includes a motor.

13. The centrifuge of claim 9 wherein the second drive mechanism includes a scraper motor.

14. The centrifuge of claim 13 wherein the scraper motor is located proximate the discharge chamber.

15. The centrifuge of claim 13 wherein the scraper motor drives a gear assembly for rotating the scraper in the discharge chamber.

16. The centrifuge of claim 15 wherein the scraper includes two scraper blades.

17. The centrifuge of claim 9 wherein the scraper includes one or more scraper blades.

* * * * *